(12) United States Patent
Miller

(10) Patent No.: US 10,002,035 B2
(45) Date of Patent: Jun. 19, 2018

(54) VISUAL SELECTION AND RENDERING OF MULTIPLE CLIP BOARD FORMATS

(75) Inventor: Steven Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1274 days.

(21) Appl. No.: 12/545,407

(22) Filed: Aug. 21, 2009

(65) Prior Publication Data
US 2011/0047506 A1 Feb. 24, 2011

(51) Int. Cl.
*G06F 9/54* (2006.01)
*G06F 17/24* (2006.01)

(52) U.S. Cl.
CPC .............. *G06F 9/543* (2013.01); *G06F 17/24* (2013.01)

(58) Field of Classification Search
CPC ................................. G06F 9/543; G06F 17/24
USPC ................................................. 715/770, 808
See application file for complete search history.

(56) References Cited

U.S. PATENT DOCUMENTS

| | | | | |
|---|---|---|---|---|
| 5,345,550 A * | 9/1994 | Bloomfield | .................... | 715/841 |
| 5,581,686 A * | 12/1996 | Koppolu et al. | .............. | 715/784 |
| 7,757,165 B1 * | 7/2010 | Stuple et al. | .................. | 715/236 |
| 2004/0073872 A1 * | 4/2004 | Yalovsky | ................ | G06F 9/543 |
| | | | | 715/249 |
| 2004/0172584 A1 * | 9/2004 | Jones et al. | .................... | 715/500 |
| 2006/0112007 A1 * | 5/2006 | Hurwitz et al. | ................ | 705/40 |
| 2007/0061747 A1 * | 3/2007 | Hahn et al. | .................... | 715/764 |
| 2008/0307308 A1 * | 12/2008 | Sullivan et al. | .............. | 715/723 |
| 2009/0007012 A1 * | 1/2009 | Mandic | ................. | G06F 3/0481 |
| | | | | 715/810 |
| 2009/0292987 A1 * | 11/2009 | Sorenson | ....................... | 715/255 |

\* cited by examiner

*Primary Examiner* — Aaron Lowenberger
(74) *Attorney, Agent, or Firm* — Steven M. Greenberg, Esq.; CRGO Law

(57) ABSTRACT

A system, method and program product for facilitating copy and paste operations of an object between a source application and a target application in an interactive computing environment. A system is disclosed that includes: a formatting system for determining a set of target formats for the object; and a container system for installing a container into the target application, wherein the container includes a selection system for selectively rendering the object in each of the target formats within the container.

18 Claims, 3 Drawing Sheets ns having a clipboard in
VISUAL SELECTION AND RENDERING OF MULTIPLE CLIP BOARD FORMATS

FIELD OF THE INVENTION

This disclosure is related to the use of clip boards in a computing environment, and more particularly to a system and method of selecting and rendering multiple clip board formats in a computing environment.

BACKGROUND OF THE INVENTION

Copy/Paste operations provide a convenient method of taking information from one computer application or document to another within a computing environment. There are standard interfaces that allow interchange of various data formats between many different applications. Clipboard operations involve cooperation between the source and destination programs to find appropriate data interchange formats that are mutually compatible. Often times there are more than one format available that both the source and destination have in common. Other times, there may be filters or modifications desired on the exchanged data that can be rendered upon pasting into the destination.

One problem that often occurs when multiple formats are available is the correct selection of the target format. This may include selecting between formatted text, unformatted text, tables, HTML, bitmaps and various image formats. Applications typically have default formats used for pasting of information, while others may allow explicit selection of formats to use when pasting. For instance, MICROSOFT OFFICE® products include the feature of "Paste Special," which allows the user to select a format for the target application. This however requires the user to select a format without seeing what the ultimate result looks like in the context of the target application until after the paste operation has occurred. If the user is unhappy with the paste result, the user's recourse is to try to modify the result or completely undo the changes and try again using a different format.

While this may not present a significant problem in some cases, in others, there may be a loss of data, undesired effects not realized until much later, or added work in altering the copied information to achieve the desired result. Accordingly, in many cases, a more robust solution for clipboard operations would be helpful for an end user.

SUMMARY OF THE INVENTION

The present invention provides a clip board system and method that gives the user immediate visual feedback as to the results of various format choices. In one embodiment, there is a clipboard system for facilitating copy and paste operations of an object between a source application and a target application in an interactive computing environment, comprising: a formatting system for determining a set of target formats for the object; and a container system for installing a container into the target application, wherein the container includes a selection system for selectively rendering the object in each of the target formats within the container.

In a second embodiment, there is a computer readable storage medium having a program product stored thereon, which when executed by a processor, facilitates copy and paste operations of an object between a source application and a target application in an interactive computing environment, comprising: program code for determining a set of target formats for the object; program code for formatting the object in each of the target formats; and program code for installing a container into the target application, wherein the container includes program code for selectively rendering the object in each of the target formats within the container.

In a third embodiment, there is a method for facilitating copy and paste operations of an object between a source application and a target application in an interactive computing environment, comprising: determining a set of target formats for the object; formatting the object in each of the target formats; and installing a container into the target application, wherein the container includes a system for selectively rendering the object in each of the target formats within the container.

When a paste operation occurs, the target application creates an container object rendering the object in a default format within the context of the target application. The object retains a connection to the clipboard system and to other formats that remain available for the pasted object. Using standard interface methods, the rendered object can sequence through available formats or be selected directly and immediately altered. Interface tools could include key presses or shortcuts, context or application menus, toolbars, or other similar means.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
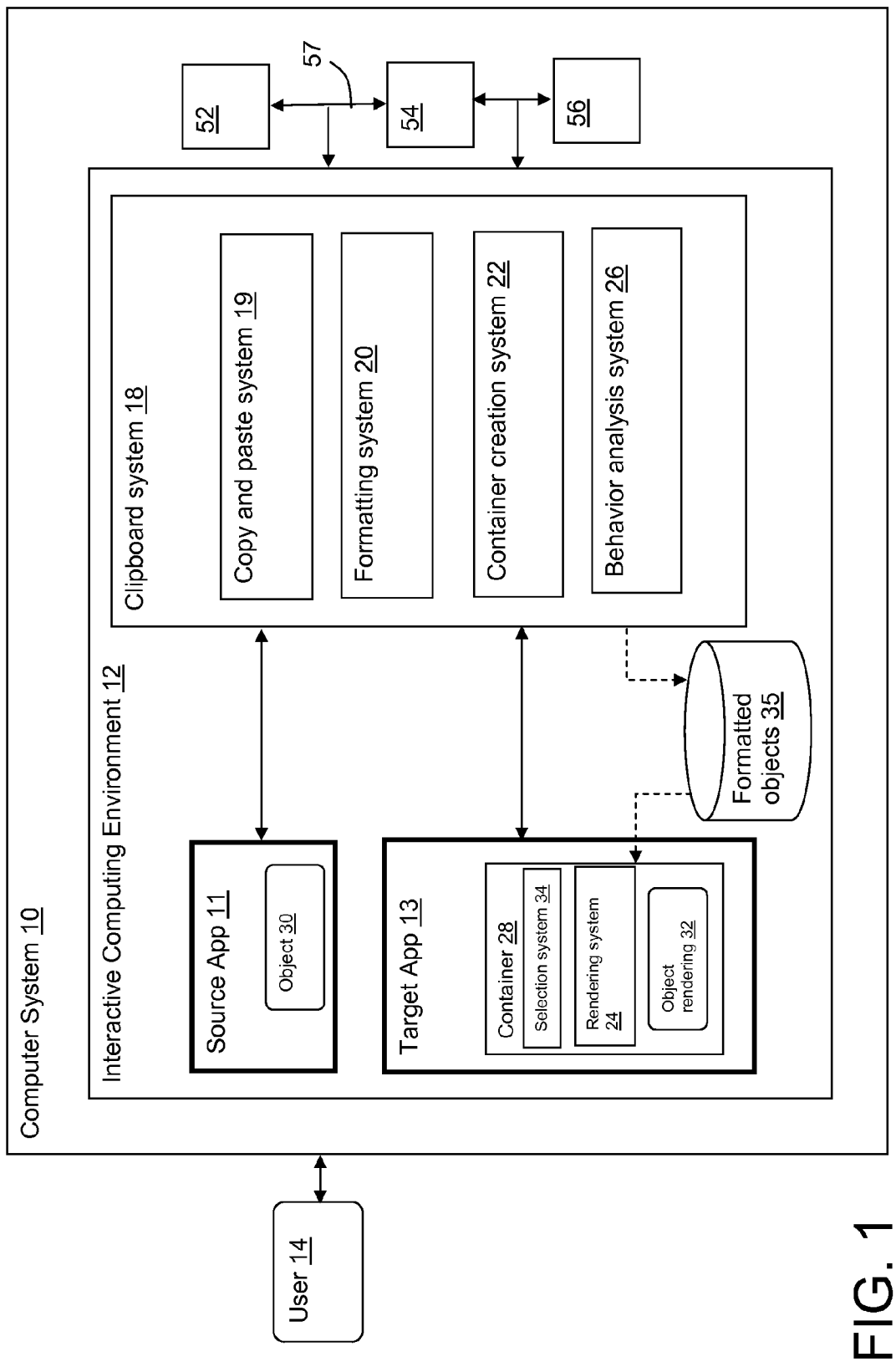
FIG. 1 depicts a computer system having a clipboard in accordance with an embodiment of the invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

FIG. 1 depicts a computer system 10 having an interactive computing environment 12 suitable for running one or more applications (e.g., source application 11 and target application 13). A typical interactive computing environment 12 may for example include an operating system running on a personal computer, an interface on a handheld device, etc. Interactive computing environment 12 generally includes a visual interface that allows a user 14 to interact with applications 11 and 13, and more particularly provides a platform in which a user 14 may copy (or cut) and paste an object 30 from one application to another application (or back to itself) using clipboard system 18. Objects may comprise any type of data or application, e.g., text, pictures, multimedia data, spreadsheets, etc. Objects may be copied and pasted from and to any type of applications. Typical applications include, but are not limited to, word processors, spreadsheets, databases, multimedia applications, browsers, email, picture viewers, etc. For the purposes of this disclosure, it is understood that the term copying in the context of a copy/paste operation includes the concept of cutting.

Rather than simply pasting an object 30 into a target application 13, the clip board system 18 of the present embodiment generates a container 28 in the target application 13 that includes an object rendering 32. The object rendering 32 comprises a visual representation of the object in the target application 13 using a default format (e.g., bitmap, rich text, PDF, etc.). Also provided with the container 28 is a selection system 34 that allows the user 14 to select and render different object formats 34 within the container 28 before actually formally pasting the object 30 into the target application 13. Using selection system 34, the user 14 can thus toggle through and view different object formats 34 in the target application 13 to identify a preferred target format. Once a preferred target format is determined, the user 14 can paste the object 30 into the target application 13 in the selected target format.

In the embodiment of FIG. 1, clipboard system 18 includes: copy and paste system 19 for facilitating copy and paste operations of an object between source application 11 and a target application 13; a formatting system 20 that determines a set of possible target formats for the object 30 in the target application 13 and generates the target formats; a container creation system 22 that creates a container for the target application 13; and a behavior analysis system 26 that analyzes user behaviors to, e.g., determine default renderings.

Formatting system 20 may utilize any now known or later developed technique for determining possible target formats for the object 30 in target application 13. As noted, there are standard interfaces that allow interchange of various data formats between many different applications. Known clipboard techniques utilize cooperation between source and target applications to find appropriate data interchange formats that are mutually compatible. Once the target formats are determined, formatting system 20 can then generate a set of formatted objects 35. Container creation system 22 likewise may utilize any now known or later developed technique for creating an object container 28. Object container 28 may typically be implemented as a graphic container, e.g., a window, panel, etc., using a widget, that can be inserted into the target application 13. Such programming constructs are readily understood and known in the object oriented programming arts. Container includes a selection system 34 for selecting a target format and a rendering system 24 for rendering the object 30 in the selected target format.

Behavior analysis system 26 may comprise any system for tracking selections and behaviors of the user 14 and then tailoring operations of the clipboard system 18 accordingly. For instance, behavior analysis system 26 may incorporate a table or database that tracks each format selection made by the user 14 for different applications and object types. Based on the selections, behavior analysis system 26 can determine default behavior for the selection system 34. For example, when copying images from a web page to a word processing document, it may be determined that user 14 typically prefers a bitmap image. Accordingly, in future operations involving similar copy and paste operations, selection system 34 will by default initially depict a bitmap image in the container 28.

Once the container 28 is placed into the target application 13, rendering system 24 is utilized to render a selected formatted object 35. Rendering system 24 likewise utilizes any technique for generating and rendering the object in each different possible target format for visual depiction within the container 28. In one embodiment, each formatted object 35 may be created and stored in a memory associated with the clipboard system 18. The user 14 can then select different format options using selection system 34, which will cause the selected formatted object 34 to be loaded into the container 28 from the memory. In an alternative embodiment, formatted objects 35 can be generated and rendered dynamically by rendering system 24 when the user 14 desires to see a different format within the container 28. Still in a further embodiment, a generated set of formatted objects 35 may be stored in a memory associated with the target application 13, thus allowing a different format to be recalled and utilized at a later time.

Figure 2:
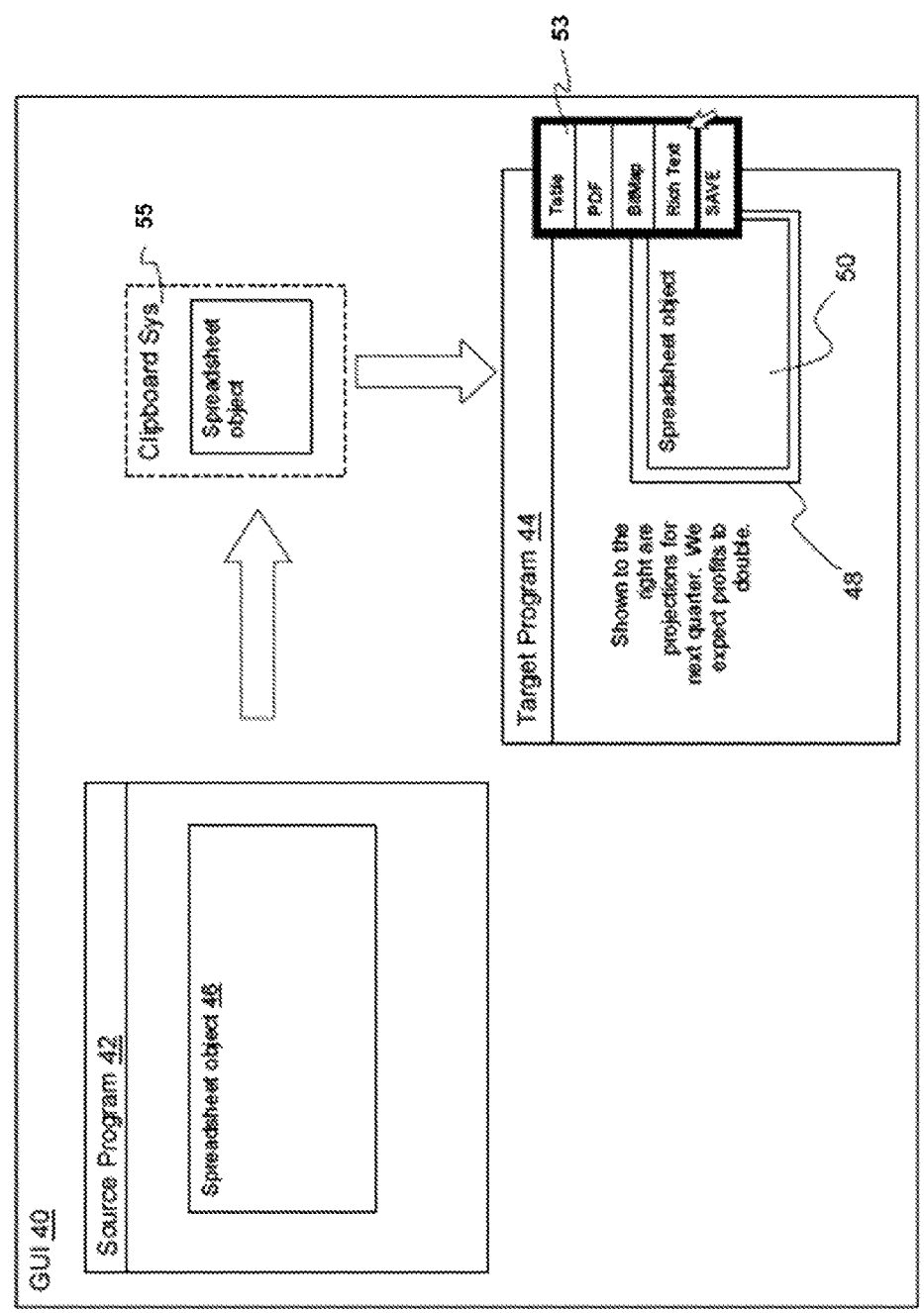
FIG. 2 depicts graphical user interface showing an example of a clipboard application in accordance with an embodiment of the invention.

Referring now to FIG. 2, an illustrative implementation of a clipboard system 55 is shown in the context of a graphical user interface (GUI) 40. In this example, a source program 42 is shown that includes a spreadsheet object 46, which is copied to a clipboard system 55. A target program 44 is shown with a container 48 in which the spreadsheet object 50 is rendered in a selected target format. It is understood the actual container 48 may be hidden or be shown to the user. Thus, in the case where the container is hidden, the user would only see the formatted object as it will actually appear when finally pasted. In either case, the user may perform actions to the container 48, such as resizing and relocating operations.

As shown, a selection system is shown as a pop-up dialog 53 that lists each of the available target formats for the spreadsheet object 50, e.g., a table, PDF, bitmap or rich text. The user is able to select each available format within pop-up dialog 53 to render the object 50 in the container 48 and see how the object 50 will actually appear in the target program 44 in the selected formatted.

The pop-up dialog 53 can be launched in any manner, e.g., with a right mouse click, clicking on the container, shortcut keys, etc. In addition, it is understood the pop-up dialog 53 represents one of any number of ways of providing object format selections within the GUI 40. For instance, rather than a pop-up dialog 53, the user could simply use the mouse wheel, up/down arrows, etc., to change format selections. In such cases, the formatted object being rendered in the container 48 could include a watermark or other indicator to let the user know what format is presently being shown.

Once a preferred format is determined, the user clicks on the save button (or shortcut key, etc.), which will remove the container and insert the formatted object into the target program 44. Other options may also be presented for the user, such as "save all" which would keep the all of the object formats in a memory associated with the target program 44 in case the user later changes his or her mind. In a further embodiment, the container 48 may be saved with the target program 44.

Figure 3:
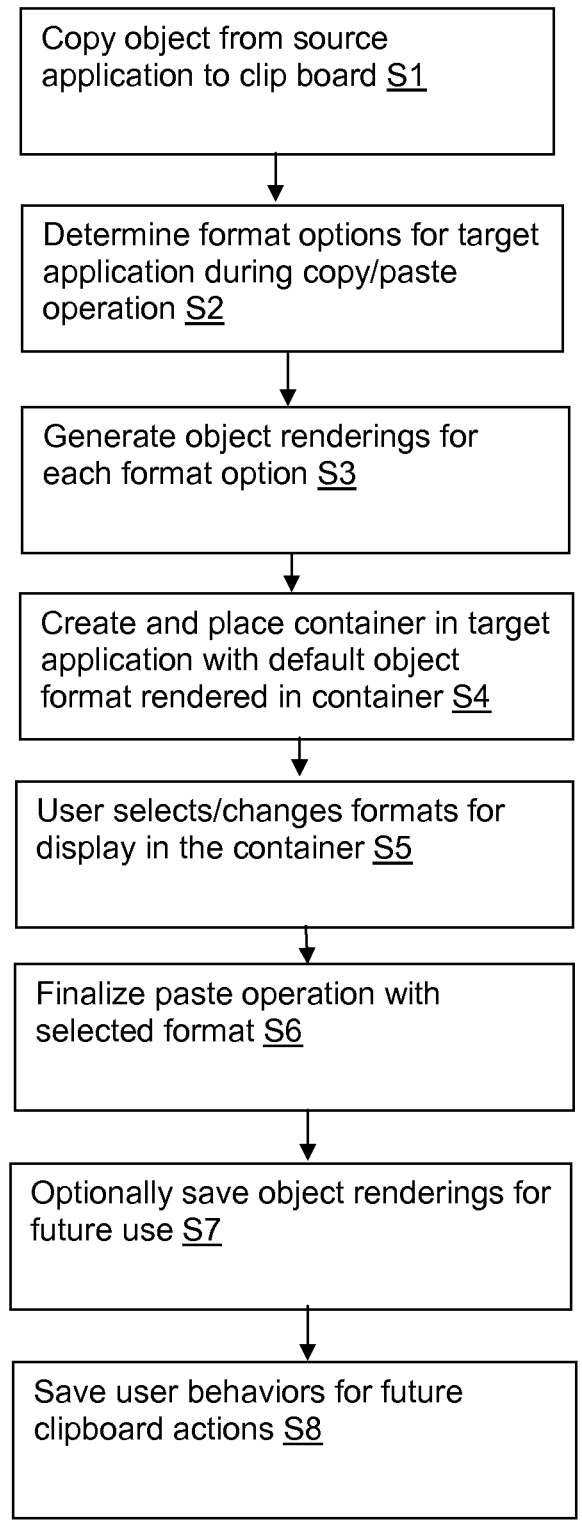
FIG. 3 depicts a flow diagram showing a process for utilizing a clipboard in accordance with an embodiment of the invention.

Referring now to FIG. 3, a flow diagram depicting a method of the present invention is shown. At S1, an object is copied from a source application to a clipboard. At S2, all of the different format options for a target application are determined and at S3, object renderings for each format option are generated. Next, at S4, a container is created and placed into the target application with a default object format rendered in the container. At S5, a user selects/changes formats for display in the container, and at S6 the paste operation is finalized with a selected format. At S7, all of the object renderings are optionally saved for future use. At S8, user behaviors are saved for future clipboard actions, e.g., default selections, etc.

Referring again to FIG. 1, it is understood that clipboard system 18 may be implemented using any type of computing device (i.e., computer system 10). Such a computing device generally includes a processor 52, input/output (I/O) 54, memory 56, and bus 57. The processor 52 may comprise a single processing unit, or be distributed across one or more processing units in one or more locations, e.g., on a client and server. Memory 56 may comprise any known type of data storage, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O 54 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. The bus 57 provides a communication link between each of the components in the computing device and likewise may comprise any known type of transmission link, including electrical, optical, wireless, etc. Although not shown, additional components, such as cache memory, communication systems, system software, etc., may be incorporated.

Access may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising a clipboard system 18 could be created, maintained and/or deployed by a service provider that offers the functions described herein for customers. That is, a service provider could offer to deploy or provide the ability to implement a clipboard system 18 as described above.

It is understood that in addition to being implemented as a system and method, the features may be provided as a program product stored on a computer-readable storage medium, which when run, enables a computer system 10 to provide a clipboard system 18. To this extent, the computer-readable storage medium may include program code, which implements the processes and systems described herein. It is understood that the term "computer-readable storage medium" comprises one or more of any type of physical embodiment of the program code. In particular, the computer-readable storage medium can comprise program code embodied on one or more portable storage articles of manufacture (e.g., a compact disc, a magnetic disk, a tape, etc.), on one or more data storage portions of a computing device, such as memory and/or a storage system.

As used herein, it is understood that the terms "program code" "computer program code," "program" and "application" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be run substantially concurrently, or the blocks may sometimes be run in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A clipboard system for facilitating copy and paste operations of an object between a source application and a target application in an interactive computing environment, comprising:
   a computer with memory and at least one processor and a clipboard object placed in a clipboard defined in the memory of the computer;
   a formatting system executing in the memory of the computer for determining a set of multiple different target data interchange formats for the object in the clipboard;
   a container system executing in the memory of the computer for formatting the object in the clipboard in each of the target data interchange formats, receiving a directive to paste the object into the target application; and, instead of pasting the object into the target application, generating a container in the target application that includes an object rendering comprising a visual representation of the object using a default format, invoking a selection system also included in the container that allows for a selection and rendering of the object in multiple different target data interchange formats within the container, and using the selection system toggling through and viewing each of the multiple different target data interchange formats to identify a preferred one of the multiple different target data interchange formats and pasting the object as formatted in the clipboard in the preferred one of the multiple different target data interchange formats; and,
a behavior analysis system collecting and analyzing user selections in order to influence a default behavior of the clipboard system by tracking different copy and paste operations and identifying for each copy and paste operation, a corresponding target application type and recording a record correlating the target application type and a respective format selected for the copy and paste operation, such that a most commonly selected format for the copy and paste operation for the corresponding application type is established as a default preferred one of the multiple different target data interchange formats.

2. The clipboard system of claim 1, wherein the formatting system formats and stores the object in each target format.

3. The clipboard system of claim 1, wherein the selection system is implemented with a user control selected from a group consisting of: a pop-up dialog, a shortcut key, and a mouse action.

4. The clipboard system of claim 1, wherein the container includes a mechanism for selecting a preferred target format and pasting the object into the target application using the preferred target format.

5. The clipboard system of claim 1, wherein the selection system includes a mechanism for causing the target application to save the object in each of the target formats.

6. The clipboard system of claim 1, wherein the container is installed as a widget.

7. A non-transitory computer readable storage medium having a program product stored thereon, which when executed by a processor, facilitates copy and paste operations of an object between a source application and a target application in an interactive computing environment, comprising:
program code for placing an object into a clipboard in memory of a computer;
program code for determining a set of multiple different target data interchange formats for the object in the clipboard;
program code for formatting the object in the clipboard in each of the target data interchange formats;
program code for receiving a directive to paste the object into the target application;
program code for, instead of pasting the object into the target application, generating a container into the target application that includes an object rendering comprising a visual representation of the object using a default format, invoking a selection system also included in the container that allows for a selection and rendering of the object in multiple different target data interchange formats within the container, and using the selection system toggling through and viewing each of the multiple different target data interchange formats to identify a preferred one of the multiple different target data interchange formats and pasting the object as formatted in the clipboard in the preferred one of the multiple different target data interchange formats; and,
program code for causing the target application to save the object in each of the target formats in order to influence a default behavior of the clipboard system by tracking different copy and paste operations and identifying for each copy and paste operation, a corresponding target application type and recording a record correlating the target application type and a respective format selected for the copy and paste operation, such that a most commonly selected format for the copy and paste operation for the corresponding application type is established as a default preferred one of the multiple different target data interchange formats.

8. The non-transitory computer readable storage medium of claim 7, wherein the program code for formatting stores the object in each target format.

9. The non-transitory computer readable storage medium of claim 7, wherein the program code for selectively rendering the object includes a user control selected from a group consisting of: a pop-up dialog, a shortcut key, and a mouse action.

10. The non-transitory computer readable storage medium of claim 7, wherein the container further includes program code for selecting a preferred target format and pasting the object into the target application using the preferred target format.

11. The non-transitory computer readable storage medium of claim 7, further comprising a program code for collecting and analyzing user selections in order to control a default behavior of the clipboard system.

12. The non-transitory computer readable storage medium of claim 7, wherein the container is installed as a widget.

13. A method for facilitating copy and paste operations of an object between a source application and a target application in an interactive computing environment, comprising:
placing an object into a clipboard in memory of a computer;
determining a set of multiple different target data interchange formats for the object in the clipboard;
formatting the object in the clipboard in each of the target data interchange formats;
receiving a directive to paste the object into the target application;
instead of pasting the object into the target application, generating a container in the target application that includes an object rendering comprising a visual representation of the object using a default format, invoking a selection system also included in the container that allows for a selection and rendering of the object in multiple different target data interchange formats within the container, and using the selection system toggling through and viewing each of the multiple different target data interchange formats to identify a preferred one of the multiple different target data interchange formats and pasting the object as formatted in the clipboard in the preferred one of the multiple different target data interchange formats; and,
causing the target application to save the object in each of the target formats in order to influence a default behavior of the clipboard system by tracking different copy and paste operations and identifying for each copy and paste operation, a corresponding target application type and recording a record correlating the target application type and a respective format selected for the copy and paste operation, such that a most commonly selected format for the copy and paste operation for the corresponding application type is established as a default preferred one of the multiple different target data interchange formats.

14. The method of claim 13, further comprising storing the object in each target format.

15. The method of claim 13, wherein the system for selectively rendering the object includes a user control selected from a group consisting of: a pop-up dialog, a shortcut key, and a mouse action.

16. The method of claim 13, wherein the container further includes a system for selecting a preferred target format and pasting the object into the target application using the preferred target format.

17. The method of claim 13, wherein the container further includes a system for causing the target application to save the object in each of the target formats.

18. The method of claim 13, wherein the container is installed as a widget.

\* \* \* \* \*